Figure 1:
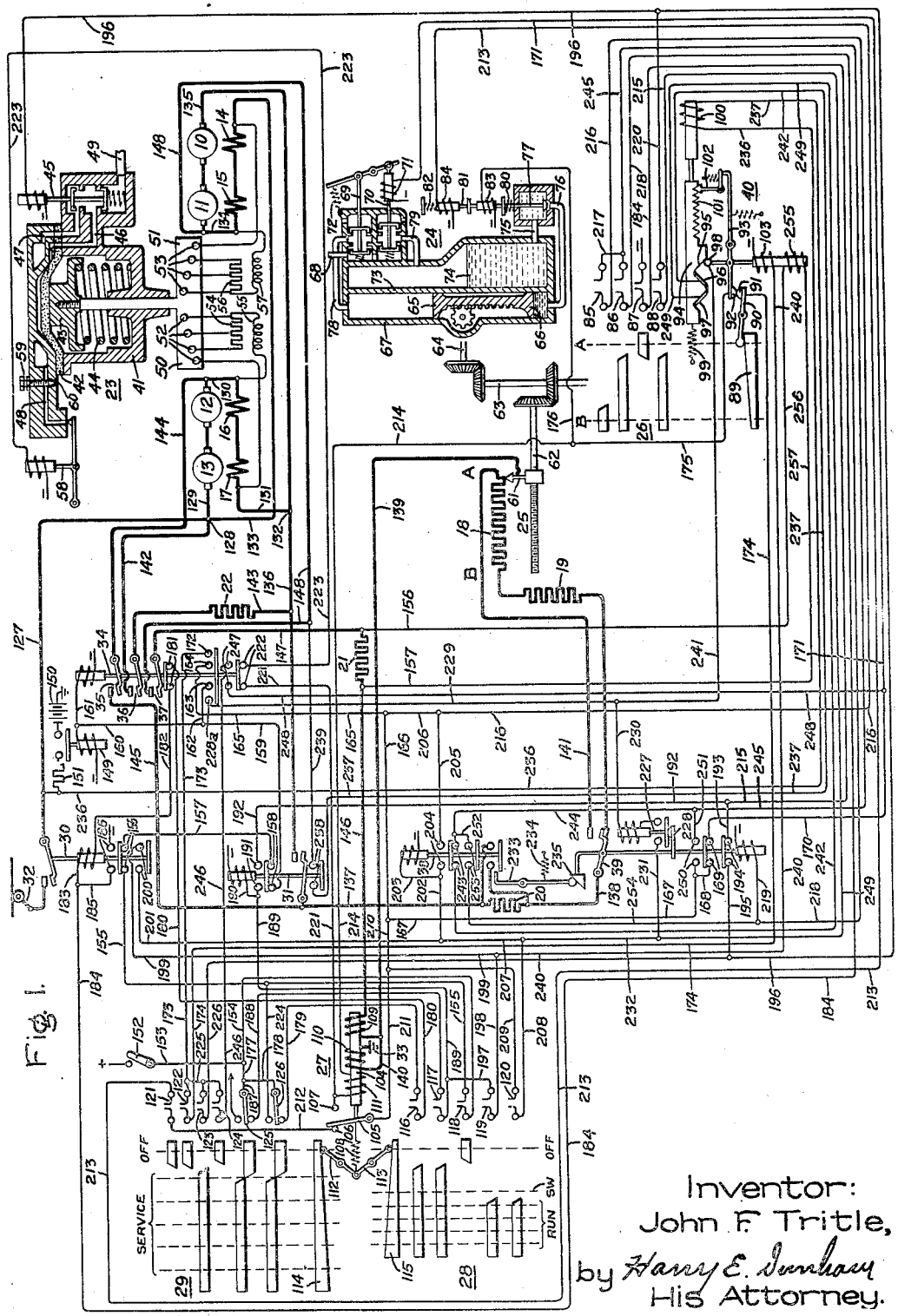

Inventor:
John F. Tritle,
by Harry E. Dunham
His Attorney.

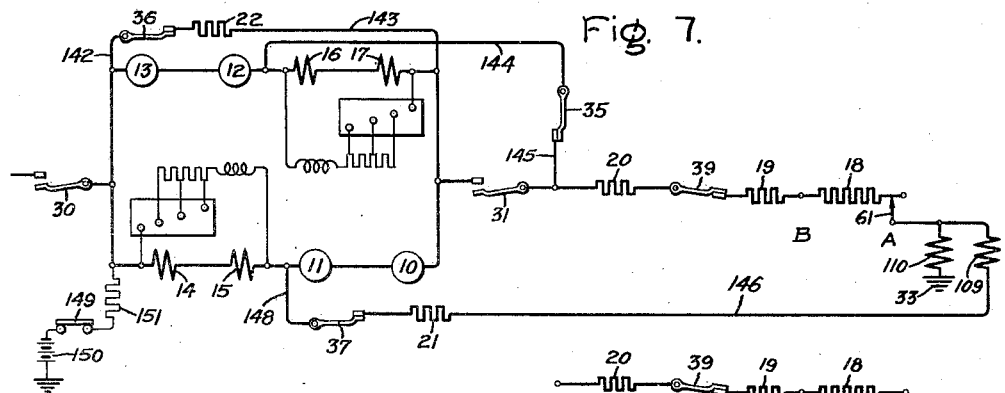
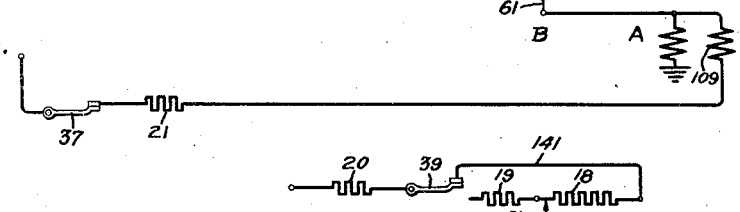
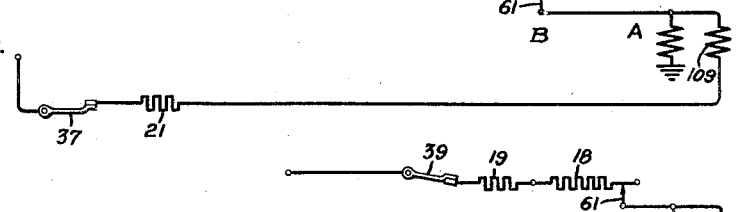
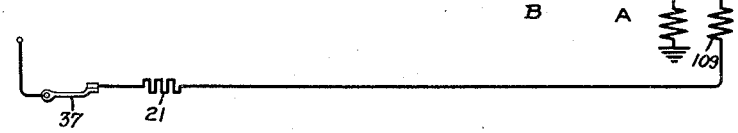
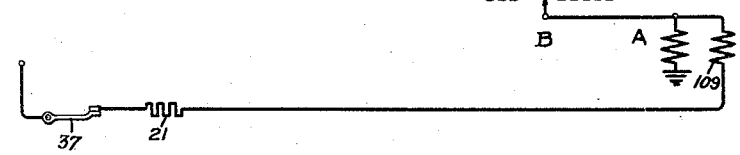
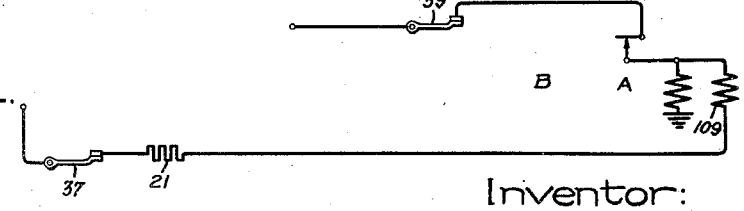
Inventor:
John F. Tritle,
by Harry E. Dunham
His Attorney.

Patented June 14, 1938

2,120,956

UNITED STATES PATENT OFFICE 2,120,956

CONTROL SYSTEM

John F. Tritle, Erie, Pa., assignor to General Electric Company, a corporation of New York Application March 17, 1937, Serial No. 131,391

23 Claims. (Cl. 172—179)

My invention relates to control systems, more particularly to motor control systems for electric vehicles, and has for an object the provision of a simple, reliable, and inexpensive control system of this character.

Various motor control systems have heretofore been proposed for propelling and braking electric vehicles. While many of such systems have been to a large extent satisfactory in the past, the constantly increasing demands of metropolitan traffic conditions, together with the higher standards of passenger comfort, necessitated by competition with other vehicles, such for example as gasoline driven busses, leaves much to be desired in the operating schedules provided by such prior control systems.

In order to meet these modern demands, it is necessary to accelerate quickly and smoothly to high speeds, for example at accelerating rates of the order of 2½ to 4¾ miles per hour per second, and to decelerate smoothly at equal or greater rates. Such high rates of acceleration and deceleration furthermore, must be accomplished without subjecting the passengers to shocks or jars due to sudden changes in the torque or the braking effort and because of the high speeds involved, extreme reliability is required. Accordingly, it is a further object of my invention to provide a simple and highly reliable motor control system for quickly and smoothly accelerating and decelerating an electric vehicle.

In carrying out my invention in one form, I provide a traction motor and a plurality of motor controlling resistors for connection in circuit therewith, together with a controller, associated with a first one of the resistors, arranged for forward and reverse operation progressively to exclude the first resistor from the motor circuit. Associated with the resistor controller, I provide transfer means operable upon exclusion of the first resistor during forward operation of the controller for quickly excluding another resistor and reinserting the first resistor in the motor circuit for exclusion a second time upon reverse operation of the controller.

More specifically, I provide a fluid operating device for the controller having opposed reciprocating pistons for operating the controller in corresponding directions and timing means for controlling the speed of the controller in both directions, the timing means comprising a body of incompressible liquid communicating with one of the pistons through a restricted orifice and means for selectively controlling the orifice to stop the controller or to increase the speed of the controller in accordance with the current flowing in the motor circuit.

In order to provide for uniformly smooth braking of the electric vehicle over a wide range of speeds, the controller, which operates through two trips during acceleration of the vehicle, is arranged to operate through four trips progressively to exclude the braking resistors.

For a more complete understanding of my invention, reference should now be had to the drawings in which Fig. 1 is a somewhat diagrammatic illustration of a control system embodying my invention; Figs. 2 to 6 inclusive are simplified circuit diagrams illustrating various stages in the accelerating operation of the vehicle; and Figs. 7 to 12 inclusive are similar simplified circuit diagrams illustrating the braking operation.

Referring now to the drawings, I have shown my invention as embodied in a control system for a plurality of traction motors 10 to 13 inclusive having series field windings 14 to 17 respectively. As shown, the principal operating elements and devices incorporated in the improved control system shown comprise a plurality of motor controlling resistors 18, 19, 20, 21, and 22; field shunting means 23; a fluid pressure operating device 24 for driving a controller 25 associated with the resistor 18; a cam switch 26 also driven by the operating device 24; an accelerating and decelerating relay 27 for controlling the speed of operation of the field shunting means 23 and the operating device 24 in accordance with the motor current; and master control means including a master accelerating controller 28 and a master braking controller 29. In addition, the control system includes a pair of line circuit breakers 30 and 31 for connecting the motors to a source of energy represented by a trolley 32 and a ground connection 33; a braking switch 34 having a plurality of main contacts 35, 36, and 37 for connecting the motors in a dynamic braking circuit with the motor controlling resistors; a cushioning contactor 38 for controlling the resistor 20; a transfer switch 39 which cooperates with the controller 25 to control the resistors 18 and 19, and a spotting relay 40 for controlling the operation of the operating device 24, the cushioning contactor 38, and the transfer means 39 during coasting to predetermine the amount of resistance initially included in the braking circuit in accordance with the speed of operation of the vehicle.

It is believed that a complete understanding of my invention may best be had from a description of the operation and accordingly certain of the operating devices and elements will first be briefly described.

The field shunting means 23, as shown, comprises a multiple contact, pressure-operated switch for progressively shunting the motor fields. This pressure operated switch comprises a casing 41 having a flexible diaphragm 42 for controlling a plunger 43 which is normally biased to its uppermost position by a spring 44. Fluid pressure is supplied to the upper side of the diaphragm 42 from a suitable source of pressure through an electrically controlled valve 45 which is normally biased to the position shown to connect the upper side of the diaphragm to atmosphere through a passageway 46, the upper port of the valve 45, and the passageways 47 and 48. When the energizing winding of the valve 45 is energized, the valve is operated to its lowermost position to connect the upper side of the diaphragm to a suitable source of fluid pressure through the passageway 46, the lower port of the valve 45 and the supply conduit 49, and the plunger 43 is thereupon moved downwardly against the bias of the spring 44.

Mounted on the lower end of the plunger 43 I provide a pair of conducting segments 50 and 51 arranged normally to engage cooperating sets of fixed contacts 52 and 53 respectively. As shown, the contacts 52 in cooperation with the conducting segment 50 control a shunt circuit for the field windings 16 and 17, which shunt circuit includes a tapped resistor 54 and a reactor 55. Similarly, the contacts 53 and the conducting segment 51 control a shunt circuit for the field windings 14 and 15, which shunt circuit includes a tapped resistor 56 and a reactor 57. With the conducting segments 50 and 51 in the normal position shown, the field windings are completely shunted, only the reactors 55 and 57 being included in the shunt circuits. As the conducting segments 50 and 51 are moved downwardly upon the application of pressure to the diaphragm 42, the resistance of the shunt circuits is gradually increased by the sequential opening of the contacts 52 and 53, the final movement of the segments 50 and 51 completely interrupting the shunt circuits.

As will be explained more fully hereinafter, it is sometimes desirable to control the rate at which the fields are shunted and accordingly an electrically operated plug valve 58 is provided for plugging the exhaust passageway 48 to control the rate at which pressure is exhausted from the upper side of the diaphragm 42 when the valve 45 is deenergized. The rate at which pressure will be exhausted from the upper side of the diaphragm with the plug valve 58 closed may initially be set by means of a needle valve 59 interposed in a second exhaust passage 60.

The controller 25 illustrated diagrammatically as comprising a movable brush arm 61 mounted on a rotatable shaft 62 may be of any desired type, but is preferably of the commutator type described and shown in my copending application Serial No. 22,745, filed May 22, 1935, entitled "Control systems", which application is assigned to the same assignee as the present invention. As is fully described in my above referred to application, controllers of this type comprise a large number of commutator bars over which suitable brush arms move to vary in small increments a resistor connected to the commutator bars. While any desired number of commutator bars may be provided, I have found it desirable in one embodiment of my invention to utilize 130 such bars in order to vary in small steps the associated resistor.

As shown, the driving shaft 62 is connected through suitable gearing to an intermediate shaft 63 which is in turn connected to the operating shaft 64 of the fluid operating device 24. This operating device 24 is provided with opposing pistons 65 and 66 reciprocating within a cylinder casing 67 and connected, as shown, by means of a suitable rack and pinion to the operating shaft 64. Operating fluid pressure is supplied from a suitable source, not shown, through a supply pipe 68, and is controlled by a pair of double-acting valves 69 and 70 which are interconnected for operation by a single operating winding 71, the valves being biased to the position shown by means of a spring 72. Adjacent the cylinder casing 67 I provide a timing chamber 73 within which is a body of incompressible liquid 74, such for example as oil, which body communicates with the lower side of piston 66 through suitable conduits 75 and 76 and a restricted orifice controlled by a valve 77.

Thus, when the operating winding 71 is deenergized, pressure is admitted directly from the supply pipe 68 through a conduit 78 to the piston 65, so as to force the reciprocating pistons downwardly to the position shown, the movable arm 61 of the controller 25 being thus operated to the position indicated by the letter A in the drawings. Likewise, when the operating winding 71 is energized, the valves 69 and 70 are reversed so that the fluid pressure on the piston 65 is exhausted to atmosphere through the right-hand port of the valve 69, and fluid pressure is admitted through the left-hand port of the valve 70 and a conduit 79 to the timing chamber 73. The incompressible liquid 74 is thus forced through the conduits 75 and 76 and the restricted orifice controlled by the valve 77 to operate the piston 66 upwardly and move the brush arm 61 of the controller 25 in a left-hand direction from position A toward position B.

It will be apparent, therefore, that the speed at which the reciprocating pistons 65 and 66 move in either direction depends upon the amount of restriction interposed by the valve 77 to the flow of the incompressible liquid through the conduits 75 and 76. Normally, this valve is biased to the partially open position, shown, by a spring 80, in which position the upper end of the valve stem engages a stop pin 81 which is normally biased to the position shown by the spring 82. The valve 77 is provided with an energizing winding or stop coil 83 and the stop pin 81 is controlled by a similar energizing winding or speed coil 84. Thus when the winding 83 is energized, the valve 77 is moved downwardly against the bias of the spring 80 to close the conduit 76 so as to stop the movement of the pistons 65 and 66 by preventing the flow of the incompressible liquid 74 through the conduit. When both of the windings 83 and 84 are deenergized, the pistons operate at a normal or low speed the flow of fluid being restricted by the valve 77 and when the winding 84 is energized to retract the stop pin 81, the valve 77 is opened further by the spring 80 to increase the size of the flow controlling orifice in the conduit 76 and thus provide for high speed operation of the pistons 65 and 66.

Mounted on the intermediate shaft 63 for movement with the brush arm 61 of the controller 25 is the cam switch 26 which is provided with a plurality of pairs of contacts 85, 86, 87, and 88 arranged to be operated between open and closed circuit positions by a plurality of associated cams. This cam switch 26 is also provided with a cam 89 for controlling a pivoted arm 90, the outer end of which supports a contact 91 in cooperating relation with a contact 92 carried by the pivoted armature 93 of the spotting relay 40.

Normally, the pivoted armature 93 is biased for movement in a clockwise direction about its pivot to separate the contacts 91 and 92, the amount of separation of the contacts 91 and 92, being determined by a cam disk 94 which is provided with a plurality of cam surfaces 95, 96 and 97 for engaging a conducting finger 98 carried by the armature 93, the cam surfaces 96 and 97 comprising conducting segments for a purpose to be more fully described hereinafter. This cam disk 94 is normally biased by a spring 99 to the position shown and is provided with an operating winding 100 which is connected across two of the motor fields, as will be more fully described hereinafter, to operate the cam disk from its biased position in accordance with the speed of the motors. As shown, the cam disk 94 is also provided with a ratchet 101 arranged to be engaged by a spring-pressed latch 102 whenever the winding 103 associated with the armature 93 is deenergized. When the winding 103 is energized, the latch 102 releases the cam disk 94 for movement in accordance with the speed of the motors and as soon as the winding 103 is deenergized, the cam disk 94 is latched in the position it then occupies, one of the cam surfaces 95, 96, or 97 then serving to limit the clockwise movement of the armature 93 so as to determine the amount which the contacts 91 and 92 will be separated. These contacts 91 and 92 control the stop coil 83 of the operating device 24 in a manner to be more fully described hereinafter and accordingly the cam switch 26 operates in a direction to move the contact 91 toward contact 92 until the contacts are engaged, whereupon the stop coil 83 is energized to stop the operating device 24, the controller 25, and the cam switch 26.

The accelerating relay 27 which controls the speed of operation of the operating device 24 and the field shunting means 23 under certain conditions is mounted adjacent the master controller 28 and the braking controller 29 and comprises a movable armature or core 104 for operating a pivoted contact member 105 having cooperating front and back contacts 106 and 107 respectively. The contact member 105 is normally biased into engagement with the front contact 106 by a spring 108 and the armature 104 is provided with a pair of series windings 109 and 110, the winding 109 being connected in the braking circuit and the winding 110 being connected in the accelerating circuit. In addition, the armature 104 is provided with a shunt winding 111, the energization of which is controlled by the back contact 107 in a manner to be more fully described hereinafter. The current setting of the accelerating and decelerating relay 27 is determined by the spring 108, one end of which is connected to a pair of pivoted adjusting arms 112 and 113, the arm 112 being arranged to engage a cam 114 carried by the braking controller 29, while the arm 113 engages a cam 115 carried by the master accelerating controller 28. Thus, it will be seen that upon movement of either of the controllers 28 or 29 from their off positions, the spring 108 will be stressed to increase the current setting of the relay 27.

As shown, the accelerating controller 28 is provided with a plurality of cam switches 116 to 120 inclusive arranged for operation by a plurality of corresponding cams and the braking controller 29 is provided with a plurality of cam switches 121 to 126 inclusive arranged for operation by suitable corresponding cams. The master accelerating controller 28 is movable from an off position through a switching position and a plurality of running positions and the braking controller 29 is movable from an off position through a plurality of service positions, the two controllers when in their respective off positions providing for a coasting operation of the vehicle.

The sequence of operations by means of which the electric vehicle is quickly and smoothly accelerated and decelerated will first be described in general and the detailed circuits utilized in accomplishing this sequence of operation will then be traced.

In order initially to apply power to the traction motors for accelerating the vehicle, the line circuit breakers 30 and 31 are closed to connect the motors to the source of energy with the fields shunted. The energizing circuit thus established for the motors may be traced from the trolley 32 through the contacts of the line breaker 30, and a conductor 127 to a common connection point 128. At this common connection point the current divides, part flowing through a conductor 129, the armatures of the motors 13 and 12, a conductor 130, the field windings 16 and 17, and by way of a conductor 131 to a second common connection point 132, while the other part of the current flows from the common connection point 128 through a conductor 133, the field windings 14 and 15, a conductor 134, the armatures of the motors 11 and 10, and by way of a conductor 135 to the common connection point 132. From this common connection point 132, the current flows through a conductor 136, the contacts of the line breaker 31, a conductor 137, the resistor 20, a conductor 138, the lower contacts of the transfer switch 39, the resistors 19 and 18, the movable brush arm 61 of the controller 25, the conductors 139 and 140, and by way of the series winding 110 on the accelerating relay 27 to the ground connection 33. The circuits thus established are shown best in Fig. 2 and it will be apparent that the traction motors are permanently connected in a parallel bridge circuit with two motors connected in each arm of the bridge between the common connection points 128 and 132.

Figure 3:
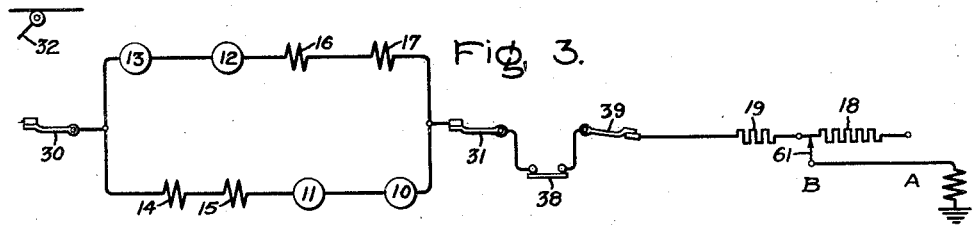

The next step in accelerating the motors is accomplished by energizing the field shunting means 23 to remove the shunts from the field windings of the motors to increase the field excitation and thereby further accelerate the motors. As soon as the motor fields are completely unshunted, the cushioning contactor 31 is energized quickly to exclude the resistor 20 from the motor circuit, whereupon the operating device 24 is energized for movement from its A position toward its B position progressively to exclude the resistor 18. In Fig. 3, I have shown the circuits established at the instant the brush arm 61 of the controller 27 completes its movement.

Figure 4:
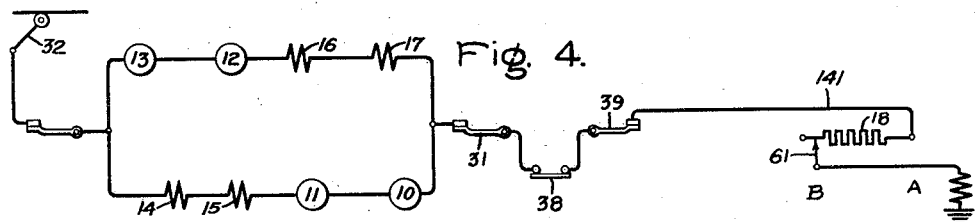
Figure 5:
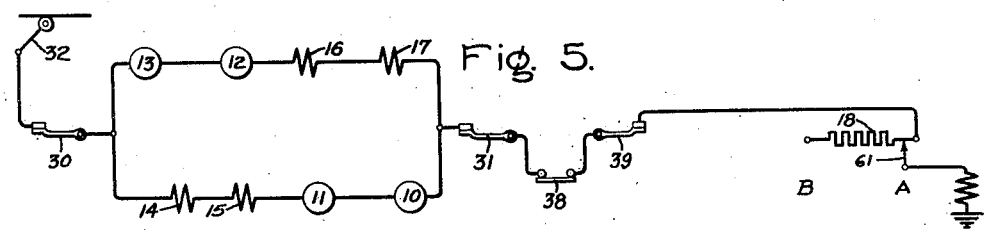

Immediately upon movement of the brush arm 61 to its B position, the transfer switch 39 is energized to exclude the resistor 19 from the motor circuit and to reinsert the resistor 18, the circuit from the transfer switch now extending through a conductor 141 which is connected to the opposite end of the resistor 18. The circuit thus established is shown in Fig. 4 and the brush arm 61 immediately begins to move in a right-hand direction towards its A position progressively to exclude the resistor 18 a second time. In Fig. 5 the accelerating circuits are shown with all of the resistors excluded from the motor circuit and the final accelerating step is then accomplished by deenergizing the field shunting means 23 again to shunt the field windings of the motors, the final accelerating circuit connections being shown in Fig. 6.

Thus, it will be seen that the resistors 18 and 19 are progressively excluded from the motor circuit by operating the brush arm 61 of the controller through two trips between its A and B positions and by substituting the resistor 18 for the fixed resistor 19 at the end of the first trip of the brush arm 61. It will be understood of course that the speed at which the brush arm 61 operates between its A and B positions, as well as the speed at which the field shunting means operates to shunt the fields at the end of the accelerating operation, is controlled by the accelerating relay 27 in a manner to be more fully described hereinafter so as to maintain a substantially constant accelerating current throughout the entire accelerating operation.

In describing the braking operation, it will be assumed that the vehicle is operating at a high rate of speed, say for example 40 miles per hour, so that the spotting relay 40 occupies the position shown in Fig. 1. In order to go from motoring operation to braking operation, the master controller 28 is moved from its running position to its off position, whereupon the vehicle will coast until such time as the braking controller 29 is operated to its service position.

As soon as the master controller 28 is operated to its off position, the line breakers 30 and 31 are deenergized to disconnect the motors from the source of energy and the braking switch 34 is energized to close its contacts 35, 36, and 37 and thereby connect the resistors 18, 19, 20, 21, and 22 in circuit with the motors for braking operation. Closure of the contacts 36 is effective to connect the resistor 22 across the two common connection points 128 and 132, the circuit extending from the connection point 128 through a conductor 142, the contacts 36, the resistor 22, and by way of the conductors 143 and 136 to the common connection point 132.

Closure of the contacts 35 and 37 is effective to connect the resistors 18, 19, 20, and 21 in a braking circuit which extends between the midpoints of the two opposite arms of the parallel bridge circuit in which the motors are permanently connected. This braking circuit extends from the conductor 130 which connects the armature of the motor 12 to the field winding 16 through a conductor 144, the contacts 35, a conductor 145, the conductor 137, the resistor 20, the lower contacts of the transfer switch 39, the resistors 19 and 18, the movable brush arm 61 of the controller 25, the conductor 139, the series winding 109 on the relay 27, the conductor 146, the resistor 21, a conductor 147, the braking contacts 37, and by way of a conductor 148 to the conductor 134 connecting the armature of the motor 11 to the field winding 15.

Thus, it will be seen that the resistors 18, 19, 20, and 21 are connected across two terminals of the bridge circuit, while the resistor 22 is connected across two other terminals of the bridge circuit. These connections are shown best in Fig. 7. I have found that by so connecting the resistor 22, automatic field shunting of the motors is provided during dynamic braking. The shunting effect of this resistor 22 varies as the voltage across the motor armatures which voltage depends upon the speed, so that at high speeds, approximately 40 miles per hour, only about 40% of the total braking current flows through the motor fields, while at low speeds of approximately 5 miles per hour, the current through the series fields reaches a maximum of about 80% of the total brake current. By means of this automatic field shunting arrangement, the motor voltages developed during braking are reduced and the control of the braking operation is considerably simplified.

In addition to the above described circuits, operation of the master control means to its coasting position energizes a field flashing contactor 149 so as to connect a battery 150 across two of the motor fields to ensure quick build-up of the braking current. As shown, one side of the battery 150 is connected directly to ground and the flashing circuit for the field windings may be traced from the other side of the battery through the contacts of the field flashing contactor 149, a current limiting resistor 151, the conductor 127, the field windings 14 and 15, the conductors 134 and 148, the braking contacts 37, the conductor 147, the resistor 21, the conductor 146, the series winding 109 on the relay 27, the conductor 140, and by way of the series winding 110 on the relay 27 to the ground connection 33.

Thus, it will be seen that the traction motors are connected in a closed dynamic braking circuit with the fields flashed and the motors would, of course, build up to initiate braking were it not for the fact that the fields are shunted, as shown in Fig. 7, by the field shunting means 23. In order to initiate braking now, it is necessary only to move the braking controller 29 to its braking position so as to energize the field shunting means 23 and thereby unshunt the field windings of the motor. The braking current thereupon quickly builds up to an effective value and the brush arm 61 of the controller 25 begins to move from its A position toward its B position to exclude the resistor 18 from the braking circuit. As soon as the brush arm 61 reaches the position shown in Fig. 8, the transfer switch 39 is energized to open its lower contact and close its upper contact, thereby to exclude the resistor 19 and reinsert the resistor 18, as shown in Fig. 9.

As described above in connection with the accelerating operation, the brush arm 61 immediately begins to move in a reverse direction toward its A position progressively to exclude the resistor 18 from the braking circuit a second time. It will be observed that during these first two trips of the brush arm 61, the resistor 20 is connected in the braking circuit. As soon as the arm 61 returns to its A position, the transfer switch 39 is deenergized to open its upper contacts and close its lower contacts and the cushioning contactor 38 immediately operates to exclude the resistor 20. Thus, the circuit connections shown in Fig. 10 are established, the resistors 18 and 19 again being connected in the braking circuit.

The brush arm 61 is now again moved in a left-hand direction toward its B position to exclude the resistor 18 a third time and the transfer switch is energized at the conclusion of this trip, as described above, to exclude the resistor 19 and reinsert the resistor 18 (see Fig. 11) whereupon the brush arm 61 again returns to its A position progressively to exclude the resistor 18 from the braking circuit a fourth time. It will be understood, of course, that the movement of the brush arm 61 during the braking operation is controlled by the relay 27, the series winding 109 being connected at all times in the braking circuit so as to maintain a constant braking current as the vehicle slows down. In the final braking position shown in Fig. 12, all the resistance is excluded from the circuit except the resistor 21.

Referring now to Fig. 1, in which all of the control devices are shown in their deenergized positions, the circuit connections for accomplishing the above described sequence of operations will be described in detail. In order initially to energize the control circuits preparatory to acceleration of the vehicle, it is necessary first to close a control switch 152 which connects the control apparatus to a suitable source of control energy. In order to simplify the drawings, this source of control energy has been indicated by conventional plus and minus signs.

Since the master controller 28 and the braking controller 29 are in their respective off positions corresponding to coasting operation, closure of the control switch 152 completes energizing circuits for the braking switch 34 and the field flashing contactor 149 to establish the coasting circuits shown in Fig. 7. The energizing circuit for the braking switch 34 may be traced from the positive source of control energy through the control switch 152, the conductors 153 and 154, the contacts 118 which are closed when the master controller 28 is in its off position, the conductor 155, the interlock contacts 156 on the line breaker 30, the conductor 157, the interlock contacts 158 on the line breaker 31, the conductors 159, 160, and 161, and by way of the energizing winding for the braking switch 34 to the negative source of control energy. The energizing circuit for the field flashing contactor extends from the intersection of the conductors 160 and 161 through the winding of the field flashing contactor to the negative source of control energy.

Simultaneously, an energizing circuit for the operating winding 71 of the operating device 24 is established to operate the valves 69 and 70 to a position in which pressure is applied to the timing chamber 73. The operating device 24 does not move so as to cause operation of the controller 25 since an energizing circuit is simultaneously established for the stop coil 83 of the device 24. The energizing circuit for the operating winding 71 extends from the intersection of the previously energized conductors 159 and 160 through a conductor 162, a pair of interlock contacts 163 and 164 on the braking switch 34, the conductors 165, 166, 167, and 168, a pair of interlock contacts 169 on the transfer switch 39, and by way of the conductors 170 and 171 through the winding 71 to the negative source of control potential. Similarly, the energizing circuit for the stop coil 83 extends from the previously referred to interlock contact 163 on the braking switch 34 through a similar interlock contact 172, the conductor 173, the normally closed contacts 122 on the braking controller 29, the conductor 174, the contacts 91 and 92 of the spotting relay 40 and by way of conductors 175 and 176 through the stop coil 83 to the negative source of control energy.

In order now to connect the motors to the main source of energy for acceleration, the master controller 28 is operated from its off position to its switching position to open the associated contacts 118 and to close the contacts 116 and 117. Opening of the contacts 118 of course deenergizes the braking switch 34 and the field flashing contactor 149, while closure of the contacts 116 and 117 establishes energizing circuits for the line breakers 30 and 31 to connect the motors in the accelerating circuit shown in Fig. 2.

The energizing circuit for the line breaker 30 may be traced from the positive source of control energy through the control switch 152, the conductors 153, 177 and 178, the normally closed contacts 126 on the braking controller 29, the conductor 179, the contacts 116 on the master controller 28, the conductor 180, the interlock contacts 181 on the braking switch 34, the conductor 182, the energizing winding of the line breaker 30, the conductors 183 and 184, and through the contacts 87 on the cam switch 26 to the negative source of control energy. It will of course be apparent that these contacts 87 on the cam switch 26 are closed so long as the cam switch 26 is in its A position. As soon as the line breaker 30 closes, a self holding circuit is established which extends from the intersection of the conductors 183 and 184 through a conductor 185 and the interlock contacts 186 on the line breaker 30 to the negative source of control energy. This holding circuit by-passes the contacts 87 on the cam switch 26 so as to maintain the line breaker 30 energized even though the cam switch 26 and the controller 25 are operated from their respective A positions.

Similarly, the energizing circuit for the line breaker 31 may be traced from the positive source of control energy through the control switch 152, the conductors 153, 177, and 187, the normally closed contacts 125 on the braking controller 29, the conductor 188, the contacts 117 on the master controller 28 and by way of the conductors 189 and 190 to the operating winding of the line breaker 31 and the negative source of control energy.

Figure 2:
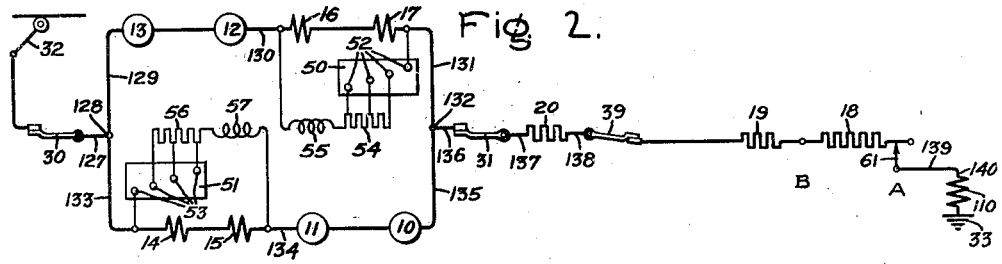

Upon closure of the line breakers 30 and 31, the motors are connected in the energizing circuit shown in Fig. 2 and begin to accelerate with the field windings shunted. Closure of the line breaker 31, moreover, is effective to complete a circuit for energizing the operating valve 45 of the field shunting means 23. Thus pressure is applied to the upper side of the diaphragm 42 and the conducting segments 50 and 51 move downwardly progressively to unshunt the field windings. This energizing circuit for the valve 45 may be traced from the intersection of the previously energized conductors 189 and 190 through the interlock contacts 191 on the line breaker 31, the conductors 192 and 193, the interlock contacts 194 on the transfer switch 39 and by way of conductors 195 and 196 through the energizing winding for the valve 45 to the negative source of control energy.

In order further to accelerate the motors after the field shunts have been removed, it is necessary to operate the master controller 28 from its switching position to a running position. Movement of the controller 28 to a running position effects closure of the contacts 119 and 120 by their associated cams. Closure of the contacts 119 establishes an energizing circuit for the cushioning contactor 38 so as quickly to exclude the resistor 20 from the motor circuit. This energizing circuit may be traced from the previously energized conductor 189 extending from the previously closed contacts 117 through a conductor 197, the contacts 119, the conductors 198 and 199, the interlock contacts 200 on the line breaker 30 and by way of the conductors 201, 202, and 203 through the energizing winding of the cushioning contactor 38 to the negative source of control energy.

Immediately upon closure of the cushioning contactor 38, an energizing circuit is established for the winding 71 of the operating device 24, which circuit may be traced from the intersection of the previously energized conductors 202 and 203 by way of the interlock contact 204 on the cushioning contactor 38, the conductors 205, 206, 166, 167, and 168, the interlock contacts 169 on the transfer switch 39 and by way of the conductors 170 and 171 to the energizing winding 71. In order to ensure that the winding 71 is energized, even though the cushioning contactor 38 fails to close, a parallel energizing circuit is established which by-passes the interlock 204 on the cushioning contactor. This parallel circuit may be traced from the intersection of the conductors 201 and 202 through the conductors 207 and 208, the contacts 120 on the master controller 28 and by way of the conductors 209 and 210 to the conductor 167 from which point the energizing circuit is identical with the circuit just traced.

As soon as the winding 71 is energized, pressure is applied to the timing chamber 73 so as to operate pistons 65 and 66 of the operating device 24 in a direction to move the brush arm 61 of the controller 25 from its A position to its B position so as progressively to exclude the resistor 18 from the motor circuit. The operating device 24 will operate at its high speed due to the fact that the speed coil 84 is now energized. The energizing circuit for this speed coil may be traced from the intersection of the previously energized conductors 209 and 210 through the conductor 211, the switch arm 105 on the accelerating relay 27 which now engages its front contact 106, a conductor 212, the normally closed switch 121 on the braking controller 29 and by way of the conductor 213 through the speed coil 84 to the negative source of control energy.

As the brush arm 61 moves from its A position toward its B position, the accelerating relay 27 operates to control the speed of the operating device 24 so as to maintain a substantially constant accelerating current. So long as the motor current is below a predetermined value, the accelerating relay 27 occupies the position shown to energize the speed coil 84 of the operating device 24. As soon as the motor current increases above a predetermined value, however, the resulting energization of the series winding 110 will effect movement of the armature 104 so as to disengage the contact 105 from the front contact 106, whereupon the speed coil 84 is deenergized and the operating device 24 slowed down so as to drive the brush arm 61 at its normal or low speed. Under these conditions, both the speed coil 84 and the stop coil 83 are deenergized and accordingly the valve 77 occupies the position shown in the drawings which corresponds to normal or average speed of the operating device 24 and the brush arm 61.

If the motor current continues to increase, the armature 104 on the accelerating relay 27 will be further operated so as to engage the movable contact 105 with back contact 107 and thereby establish an energizing circuit for the stop coil 83 on the device 24. This energizing circuit extends from the pivoted contact 105 on the accelerating relay through the back contact 107, the shunt winding 111 on the accelerating relay and by way of the conductors 214 and 176 through the stop coil 83 to the negative source of control energy. Energization of the stop coil 83 is of course effective to close the valve 77 and stop the operating device 24 and the brush arm 61 of the controller 25.

It has been found that if the operating device 24 is thus stopped and held by the stop coil until the motor current drops to such a value that the series winding 109 of the accelerating relay releases the armature 104 for movement to disengage the pivoted contact 105 from the back contact 107, the brush arm 61 will move forward in a series of steps of such duration as to cause the motor current to undergo rather severe fluctuations. Accordingly, the shunt coil 111 on the accelerating relay 27 is arranged as shown to oppose the series winding 109 and cause the energizing circuit for the stop coil 83 to be interrupted immediately after it is closed. Thus, by connecting the shunt coil 111 for energization simultaneously with the stop coil 83, a vibrating characteristic is obtained which causes a very slow movement of the brush arm 61, depending upon the time that the contacts 105 and 107 remain closed. Thus if a very heavy current flows in the circuit the contacts 105 and 107 remain closed a greater portion of the time and a very slow speed movement of the controller is obtained. If a somewhat smaller current is flowing, the contacts 105 and 107 will be closed only a brief portion of the time and accordingly a higher controller speed will be obtained. It will be understood of course that in each case the controller speed is less than the normal slow speed.

It will be observed that the master controller 28 is provided with a plurality of running positions and that movement of the master controller from one to the other of these running positions does not affect the circuit connections established, but serves only to increase or decrease the tension of the biasing spring 108 on the accelerating relay 27 so as to vary the current setting of the relay and thus control the value of the motor current which will be maintained by the operating device 24 and the controller 25.

Continuing now with the description of the operating sequence, as soon as the brush arm 61 reaches its B position so as to entirely exclude the resistor 18 from the motor circuit, as shown in Fig. 3, an energizing circuit will be established for the transfer switch 39 so as to exclude the resistor 19 from the motor circuit and to reinsert the resistor 18, as shown in Fig. 4. This energizing circuit may be traced from the intersection of the previously energized conductors 205 and 206 through a conductor 216, the contacts 85 on the cam switch 26, which are now closed since the cam switch 26 is in its B position, a conductor 217, the contacts 86 on the cam switch 26, which also are now closed, the conductors 218 and 219, and by way of the energizing winding of the transfer switch 39 to the negative source of control energy.

Upon operation of the transfer switch 39 to its uppermost position, the previously traced energizing circuit for the winding 71 of the operating device 24 is interrupted at the interlock contacts 169 and accordingly the valves 69 and 70 move to their biased positions, shown, so as to apply pressure to the piston 65 and connect the timing chamber 73 to atmosphere, thereby to effect operation of the pistons 65 and 66 in a reverse direction so as to move the brush arm 61 of the controller 25 from its B position toward its A position. It will likewise be observed that the interlock contacts 194 on the transfer switch 39 open to interrupt the energizing circuit for the valve 45 of the field shunting means 23. This valve 45 is maintained energized, however, through a circuit by-passing the interlock contacts 194, which circuit extends from the intersection of the conductors 192 and 193 through a conductor 215, the contacts 88 on the cam switch 26, which contacts are now closed, and by way of the conductor 220 to the conductor 196 which extends to the operating winding of the valve 45.

Movement of the brush arm 61 from its B position to its A position is effective progressively to exclude the resistor 18 from the motor circuit and when the brush arm reaches its A position, the connections shown in Fig. 5 are established, all of the resistors being excluded from the motor circuit. As soon as the brush arm 61 reaches its A position, the contacts 88 on the cam switch 26 open to deenergize the operating winding for the valve 45 on the field shunting means 23 and accordingly the valve 45 operates to its biased position shown to connect the upper side of the diaphragm 42 to atmosphere, as described above. Therefore, the spring 44 forces the plunger 43 upwardly and operates the conducting segments 50 and 51 into sequential engagement with the contacts 52 and 53, progressively to shunt the field windings of the motors.

Figure 6:
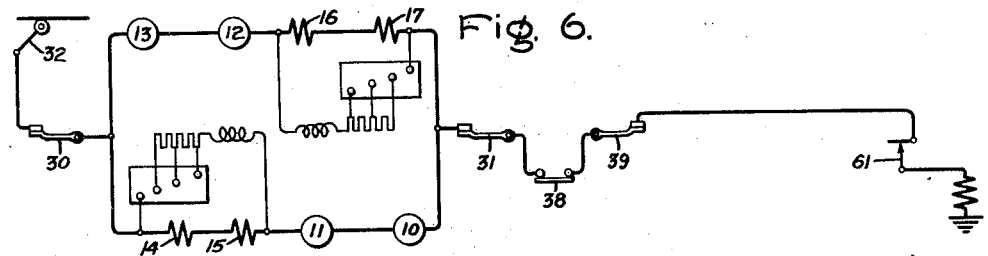

The speed at which the plunger 43 operates to shunt the motor fields is controlled by the accelerating relay 27 in a manner similar to that in which the operating device 24 is controlled. It will be observed that whenever the movable contact 105 of the accelerating relay engages the back contact 107, an energizing circuit is completed for the operating winding of the plug valve 58, which circuit extends from the back contact 107 through a conductor 221, the interlock contacts 222 on the braking switch 34, and by way of a conductor 223 through the operating winding of the plug valve 58 to the negative source of control energy. As described above, energization of the plug valve 58 restricts the exhaust passageway 46 and accordingly slows down the movement of the plunger 43, and it will be understood that the shunt coil 111 cooperates with the energizing winding of the plug valve 58 in the same manner as it cooperates with the stop coil 89 on the operating device 24 to provide a vibratory action, the shunt winding 111 being energized in parallel circuit relation with the operating winding of the plug valve 58 through the previously traced energizing circuit for the stop coil 82. Fig. 6 illustrates the final circuit connections for accelerating the motors, all of the resistance being excluded from the motor circuit, and the fields being shunted.

It will be remembered that the energizing circuit for the transfer switch 39 includes the contacts 85 and 86 on the cam switch 26. In order to maintain the transfer switch in its uppermost position when the cam switch 26 and the brush arm 61 return to their respective A positions, a holding circuit is provided for by-passing the contacts 85 and 86. This holding circuit, which is completed only when both the cushioning contactor 38 and the transfer switch 39 are in their respective energized positions, extends from the previously energized conductor 167 through the interlock contacts 250 on the transfer switch 39, the conductors 251, 244, and 252, the interlock contacts 253 on the cushioning contactor 38, and by way of the conductors 254 and 219 to the energizing winding of the transfer switch 39 and the negative source of control energy. Thus the circuits shown in Fig. 6 are maintained until the master controller 28 is returned to its switching position.

It will be understood of course that the complete accelerating cycle just described takes place in a comparatively short time and accordingly the circuit connections shown in Fig. 6 are established before the speed of the car has assumed a very high value. After this final circuit is established, the car continues to accelerate, the final maximum speed being determined by the load and the grade conditions.

It will now be assumed that the vehicle is operating at a high rate of speed, say for example 40 miles per hour, and that it is desired to initiate braking at this speed. Accordingly, the master controller 28 is operated to its off position to open the contacts 116, 117, 119, and 120 and thereby interrupt the energizing circuits for the line breakers 30 and 31, as well as the energizing circuits for the cushioning contactor 38 and the transfer switch 39. Simultaneously, the contacts 118 are closed to establish the previously traced energizing circuits for the braking switch 34 and the field flashing contactor 149, thereby to connect the motors in the braking circuit shown in Fig. 7, as described above. Since the motors are now operating at a high rate of speed, and since the field windings 14 and 15 are energized through the previously traced field flashing circuit, the motors would build up as series generators to establish dynamic braking, were it not for the fact that the fields are shunted. Therefore, in order to initiate braking, it is necessary only to operate the braking controller 29 from its off position to its service position, which operation is effective to complete an energizing circuit for the operating winding of the valve 45 on the field shunting means and unshunt the fields.

This energizing circuit for the operating winding of the valve 45 may be traced from the positive source of control energy through the control switch 152, the conductors 153, 177, and 178, the switch 126 which is now operated to its uppermost position by the associated cam on the braking controller, the conductors 224 and 155, the interlock contacts 156, the conductor 157, the interlock contacts 158, the conductors 159 and 162, the interlock contacts 163 and 172 on the braking switch 34, the conductors 173 and 225, the contacts 123 on the braking controller, and by way of the conductors 226 and 196 to the operating winding of the valve 45.

It will be remembered that the operating winding 71 of the operating device 24 is energized through a circuit which includes the interlock contacts 168 on the transfer switch 39 and since movement of the braking controller 29 to its service position is effective to deenergize the stop coil 83 on the operating device 24 by opening the contacts 122 of the braking controller, the operating device 24 thus begins to move so as to operate the brush arm 61 from its A position toward its B position progressively to exclude the resistor 18 from the braking circuit. The operating device 24 moves at its normal average speed since the energizing circuit for the speed coil 84, which extends through the front contact 106 of the relay 27 and the contacts 121 of the braking controller 29, is open at the contacts 121. As the brush arm 61 of the controller 25 moves toward its B position, the relay 27 operates to control the speed of the device 24 and the brush arm 61, the series winding 109 of the relay 27 being connected in the braking circuit, as shown in Fig. 7. Whenever the braking current exceeds a predetermined value, the back contact 107 on the relay 27 is engaged by the movable contact 105 to energize the stop coil 83, as described above, and thus control the speed of operation of the brush arm 61.

When the brush arm 61 reaches its B position, the resistor 18 is entirely excluded from the braking circuit, as shown in Fig. 8, and the transfer switch 39 will be energized by closure of the switches 85 and 86 on the cam switch 26, the circuit now extending from the energized interlock contact 164 through the conductors 165, 206 and 216, the switches 85 and 86 and the conductors 218 and 219 to the energizing winding of the transfer switch 39. Thus the resistor 19 will be excluded from the braking circuit and the resistor 18 will be reinserted in the braking circuit, as shown in Fig. 9.

It will be observed that when the transfer switch 39 is operated to its uppermost position, a small auxiliary relay 227 is moved to its closed circuit position by a finger 228 carried on the transfer switch, the relay 227 thereupon sealing itself closed through a circuit which may be traced from the previously energized interlock contact 163 on the braking switch 34 through a cooperating interlock contact 228a, the conductors 229 and 230, the winding on the relay 227, the contacts of the relay 227, and by way of the conductors 231, 232, 207, 202, 203, and the energizing winding of the cushioning contactor 38 to the negative source of control energy.

It will thus be seen that with the braking switch 34 closed, operation of the transfer switch 39 to its uppermost position effects energization of the cushioning contactor 38. The cushioning contactor 38, however, is held against operation to its closed position so long as the transfer switch 39 is in its uppermost position by a mechanical interlock comprising a pivoted lever 233, which is normally biased by a spring 234 to an ineffective position shown. Upon operation of the transfer switch to its uppermost position, the lever 233 is moved by a cam 235 carried by the transfer switch so that the upper end of the lever 233 extends into the path of movement of the cushioning contactor 38 and thereby prevents its operation to its closed circuit position. It will be apparent, however, that the interlocking lever is effective to control the cushioning contactor 38 only if the transfer switch 39 is energized prior to energization of the cushioning contactor, since the cushioning contactor, once it has been operated to its closed circuit position, is not affected by operation of the interlock lever 233.

As described above in connection with the accelerating operation, movement of the transfer switch 39 to its uppermost position interrupts the energizing circuit for the winding 71 at the interlock contacts 169 and accordingly the brush arm 61 immediately starts to move from its B position toward its A position again to exclude the resistor 18 from the braking circuit. As soon as the brush arm 61 reaches its A position, the contacts 86 on the cam switch 26 open to deenergize the transfer switch 39, whereupon the transfer switch moves to its lowermost position to reinsert the resistors 18 and 19 in the motor circuit, as shown in Fig. 10. It will be remembered that the initial energizing circuit for the transfer switch 39 includes the contacts 85 and 86 on the cam switch 26. Although the contacts 85 open as soon as the cam switch 26 moves from its B position, the energizing circuit is maintained, until the cam switch reaches its A position and the contacts 86 open, by means of a by-pass circuit which may be traced from the intersection of the conductors 165 and 206 in the previously traced energizing circuit through the conductors 166 and 167, the interlock contacts 250 on the transfer switch 39 and by way of the conductors 251 and 245 to the contacts 86.

Immediately upon operation of the transfer switch 39 to its lowermost position, the interlock lever 233 releases the previously energized cushioning contactor 38 for movement to its closed circuit position to exclude the resistor 20 from the braking circuit and accordingly the circuit connections shown in Fig. 10 are established. At the same time, the cushioning contactor 38 seals itself in through the interlock contacts 204, which contacts establish a short circuit around the energizing winding of the auxiliary relay 227 to permit the relay to open. This short circuit extends from the intersection of the conductors 202 and 203 in the energizing circuit of the relay 227 through the interlock contacts 204, the conductors 205, 206, and 165, and by way of the interlock contact 164 to the interlock contact 228a in the previously traced energizing circuit of the relay 227.

Upon operation of the transfer switch 39 to its lowermost position, the winding 71 of the operating device 24 is again energized through the interlock contacts 169 of the transfer switch and accordingly the brush arm 61 of the controller 25 is again operated from its A position toward its B position to exclude the resistor 18 from the braking circuit a third time. As described above, as soon as the brush arm reaches its B position, the transfer switch 39 is energized through the contacts 85 and 86 of the cam switch 26, whereupon the resistor 19 is again excluded from the braking circuit and the resistor 18 reinserted, as shown in Fig. 11. Again, operation of the transfer switch 39 to its uppermost position interrupts the energizing circuit of the winding 71 at the interlock contacts 169 and accordingly the brush arm 61 moves from its B position toward its A position progressively to exclude the resistor 18 from the braking circuit a fourth time. The final braking position is shown in Fig. 12, the resistors 18, 19, and 20 being excluded from the braking circuit and the resistor 21 being retained to prevent short circuiting of the motors.

The transfer switch 39 is maintained energized upon return of the cam switch 26 to its A position at the completion of the braking operation by the holding circuit traced above in connection with the accelerating operation. Thus the connections shown in Fig. 12 are maintained until the braking controller 29 is operated to its off position, and the accelerating controller 28 is operated to interrupt the energizing circuit for the braking switch 34.

As will be well understood by those skilled in the art, series excited traction motors will not build up as series generators unless the external resistance connected in the armature circuits is less than a critical resistance, which critical resistance depends upon the speed at which the motors are driven. In the above described braking operation, it was assumed that the vehicle was operating at a high rate of speed, for example 40 miles per hour, and since the sum of the resistors 18, 19, 20, and 21 is less than the critical resistance of the traction motors at this speed, the motors build up to establish dynamic braking as soon as the braking controller is operated to remove the field shunts. If, however, the vehicle is operated at a lower speed, it will be seen that unless special provision is made a considerable time interval will elapse between operation of the braking controller and the time that the motors build up as series generators due to the fact that the controller 25 must move through a portion of its cycle to exclude a portion of the resistance in the braking circuit, depending upon the speed at which the vehicle is operated. In order to ensure that braking will be established immediately upon operation of the braking controller at all speeds, the spotting relay 40 is provided for operating the controller 25 during coasting to predetermine the resistance included in the braking circuit upon operation of the braking controller.

As briefly described above, the spotting relay 40 is provided with a winding 100 connected for energization in accordance with the speed of the traction motors to operate a cam 94 which cooperates with the winding 103 to control the contact 92, the conducting finger 98 and the latch 102. Upon operation of the master controller 28 from its off position to its switching position, a circuit is established for connecting the energizing winding 100 across the motor fields 14 and 15 so as to energize the winding 100 in accordance with the speed of the motors and upon operation of the controller 28 to its running position, an energizing circuit is established for the winding 103 so as to release the cam disk 94 for movement in accordance with the energization of the winding 100.

The energizing circuit for the winding 100 extends from the right-hand terminal of the field winding 14 through the conductor 127, a conductor 236, the winding 100, a conductor 237, a pair of interlock contacts 238 on the line breaker 31, and by way of the conductors 239 and 148 to the left-hand terminal of the field winding 15. Likewise, the energizing circuit for the winding 103 extends from the contacts 119 which are closed when the controller 28 is in its running position through the conductors 198 and 240 by way of the winding 103 to the negative source of control energy. As soon as the winding 103 is energized to release the latch 102, the cam disk 94 is moved to its extreme right-hand position against the bias of the spring 99, the inductive kick which occurs upon initial energization of the field windings 14 and 15 being sufficient to cause operation of the cam disk 94 to this position as soon as it is released.

The cam disk 94 is maintained in this extreme right-hand or low speed position during the complete accelerating cycle which, as described above, takes place in a comparatively short time. As soon as the circuit connections shown in Fig. 6 are established, the field windings being shunted, the cam disk 94 begins to move back toward its left-hand or high speed position as the speed of the motors increases, the winding 100 being so related to the field windings 14 and 15 that movement of the disk 94 is a direct measure of the motor speed.

If the vehicle attains its high rate of speed before it is desired to initiate braking, the cam disk 94 will occupy the position shown and the braking operation will take place as described above. If, however, it is desired to initiate braking with the vehicle operated at a somewhat lower rate of speed, say 35 miles per hour, the cam disk 94 will occupy a position slightly to the right of that shown and accordingly when the master controller 28 is returned to its off position, the cam disk 94 will be latched in a position such that the finger 98 comes to rest part way up the cam surface 95 when the winding 103 is deenergized by opening of the contacts 120.

With the cam disk 94 latched in this position, it will be seen that the contacts 91 and 92 are separated a short distance and accordingly the previously traced energizing circuit for the stop coil 83 on the operating device 24 is interrupted. Therefore, as soon as the master controller 28 is operated to its off position, the operating device 24 begins to move the controller 25 so that the brush arm 61 moves toward its B position. This movement of the brush arm 61 toward its B position continues until the contact 91, operated by the cam 89 on the cam switch 26, engages the contact 92 to energize the stop coil 83. Thus a portion of the resistor 18 will be excluded from the braking circuit during the coasting operation and as soon as the braking controller 29 is operated to its service position to unshunt the motor fields, the braking current will immediately build up. As mentioned above, the operation of the braking controller to its service position also interrupts at the contacts 122 the energizing circuit for the stop coil 83, which circuit extends through the contacts 91 and 92, leaving the stop coil 83 under the control of the relay 27. Therefore, the brush arm 61 immediately begins moving again toward the B position and the remainder of the braking operation is carried out as described above.

If the vehicle is operating at a still lower speed, say 30 miles per hour, when it is desired to initiate braking, the cam disk 94 will be still further to the right when latched upon operation of the controller 28 to its off position and accordingly the conducting finger 98 will come to rest in the apex of the notch between the cam surfaces 95 and 96 in engagement with the conducting surface 96. Since the contacts 91 and 92 are separated, the operating device 24 immediately begins to move the brush arm 61 from its A position toward its B position and as soon as the contacts 86 on the cam switch 26 close, an energizing circuit is established for the transfer switch 39, which circuit may be traced from the previously energized interlock contact 228a on the braking switch 34 through the conductors 229 and 241, the conducting finger 98, the conducting segment 96, a conductor 242, the interlock contacts 243 on the cushioning contactor 38, the conductors 244 and 245, the contacts 86, the conductors 218 and 219, and by way of the energizing winding of the transfer switch 39 to the negative source of control energy. Thus the transfer switch 39 is operated to its uppermost position and the brush arm 61 continues to operate until it reaches its B position in which position the contact 91 engages the contact 92 so as to stop the brush arm 61. Thus the circuit connections shown in Fig. 9 are established.

It will be remembered that operation of the transfer switch 39 to its uppermost position during either accelerating or braking is effective to deenergize the winding 71 on the operating device 24. During coasting, however, a by-pass circuit is established which maintains the winding 71 energized regardless of the position of the transfer switch 39, this by-pass circuit being traceable from the previously energized interlock contact 163 on the braking switch 34 through the similar interlock contact 172, the conductors 173 and 225, the contacts 124 which are closed when the braking controller 29 is in its off position, a conductor 246, the interlock contacts 247 on the braking switch 34, and by way of the conductors 248 and 171 to the winding 71. As soon as the braking controller 29 is operated to its service position to unshunt the fields and initiate braking, as described above, the energizing circuit just traced for the winding 71 of the operating device 24 is interrupted at the contacts 124 and since the transfer switch 39 is in its uppermost position, the operating device 24 immediately begins to move the brush arm 61 from its B position toward its A position, the remainder of the braking cycle thereupon being carried out as described above.

If the vehicle is operating at a still lower speed, say, 25 miles per hour, the spotting relay will operate exactly as described above except that the conducting finger 98 comes to rest half way down the conducting surface 96 and accordingly, the contacts 90 and 91 will be closed when the brush arm 61 reaches a position midway between its A and B positions. Thus, the remainder of the circuit connections being as shown in Fig. 9, braking is initiated with all of the resistor 19 and half of the resistor 18 excluded from the braking circuit.

At a speed of approximately 20 miles per hour, the cam disk 94 is latched in such a position that the conducting finger 98 engages the conducting surface 97 adjacent its crest. In this position, the contacts 91 and 92 are maintained closed and accordingly, the brush arm 61 remains in its A position. An energizing circuit is completed, however, which immediately effects closure of the cushioning contactor 38 so as to establish the circuit connections shown in Fig. 10. This energizing circuit for the cushioning contactor 38 extends from the conducting finger 98 through the conducting segment 97 and by way of the conductors 249, 232, 207, 202, and 203 to the energizing winding of the cushioning contactor 38. Thus, as soon as the braking controller 29 is operated to unshunt the fields and to interrupt at the contacts 122 the energizing circuit for the stop coil 83, the brush arm 61 begins to move from its A position toward its B position and the remainder of the braking cycle is carried out, as described above. The same operation occurs if braking is initiated with a vehicle operating at a speed of 15 miles per hour except that the conducting finger 98 comes to rest half way up the conducting surface 97. Under these conditions, the contacts 91 and 92 are opened and the brush arm 61 moves toward its B position until these contacts are engaged. Thus, the circuit connections established prior to braking are identical with those shown in Fig. 10 except that half of the resistor 18 is excluded from the braking circuit.

If braking is initiated at a still lower speed, say 10 miles per hour, the cam disk 94 occupies its extreme right-hand position, the contact finger 98 coming to rest at the uppermost end of the conducting surface 97. Thus, the cushioning contactor 38 is immediately energized, as described above, and the brush arm 61 moves all the way to its B position before the contacts 91 and 92 close. As soon as the brush arm 61 reaches its B position, the transfer switch 39 is energized through closure of the contacts 85 on the cam switch 26 and accordingly the circuit connections shown in Fig. 11 are established.

It will now be apparent that the spotting operation which predetermines the resistance initially included in the braking circuit is quickly accomplished at low speeds without waiting for the brush arm 61 to move through two or three trips by arranging the conducting segments 96 and 97, as described above. With this arrangement, spotting is accomplished by moving the brush arm through a maximum of one trip between its A and B positions.

It is sometimes desirable, after braking has been established, to permit the vehicle to coast for a short time and then to reestablish the braking. In order that the braking circuits may be maintained during this coasting operation so that the braking will become effective immediately at the termination of the coasting operation, the spotting relay 40 is provided with an additional winding 255, which winding is connected across the resistor 21 by means of the conductors 256 and 257. As soon as an appreciable braking current flows through the resistor 21, the winding 255 is energized to move the armature 93 and release the latch 102 on the spotting relay. Since the energizing winding 100 is deenergized, its circuit being interrupted at the interlock contacts 233 on the line breaker 31, the cam disk 94 immediately moves to its extreme left-hand or biased position shown. In this position the contacts 91 and 92 are maintained closed at all times regardless of the position of the brush arm 61 and the cam switch 26 and accordingly as soon as the braking controller 29 is operated to its off position, the stop coil 83 of the operating device is energized to stop the brush arm 61 in the position it then occupies. Operation of the braking controller to its off position is effective to kill the braking action since the operating winding of the valve 45 on the field shunting means 23 is deenergized by opening of the contacts 123 on the braking controller so as to shunt the motor fields. Reestablishment of the braking current may thus be accomplished simply by returning the controller to a service position to unshunt the fields.

While I have described in some detail the complete control system in order to facilitate a complete understanding of my invention, it should be understood that no claim is herein made to the specific spotting means shown, nor to the detailed arrangement of the shunt coil 111 on the accelerating and decelerating relay 27, these and certain other features being fully described and claimed in a copending application, Serial No. 138,818, filed April 24, 1937, by Jacob W. McNairy and me, which application is assigned to the same assignee as the present invention. Likewise, I do not herein claim the feature of spotting with the fields shunted and initiating quickly the braking operation by unshunting the fields since this feature is broadly described and claimed in a copending application of Jacob W. McNairy, Serial No. 139,487, filed April 28, 1937, which application is assigned to the same assignee as the present invention.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States, is:

1. In a control system, a plurality of resistors, a controller for varying one of said resistors, switch mechanism for connecting said resistors in a control circuit with each other for exclusion of said one resistor from said circuit by movement of said controller in one direction and for connecting said one resistor in said control circuit alone for exclusion from said circuit of said one resistor by return movement of said controller.

2. In a control system, a fixed resistor, a variable resistor, contact mechanism movable in either of two directions for varying said variable resistor, connections connecting one end of one of said resistors to one end of the other of said resistors, connections for connecting said contact mechanism in a control circuit, switching mechanism for connecting the other end of said fixed resistor in said control circuit for exclusion from said circuit of said variable resistor by movement of said contact mechanism in one direction and for connecting the other end of said variable resistor in said control circuit for exclusion from said circuit of said variable resistor by return movement of said contact mechanism.

3. In a control system a fixed resistor, a variable resistor, contact mechanism movable in either of two directions for varying said variable resistor, connections for connecting one end of one of said resistors to one end of the other of said resistors, connections for connecting said contact mechanism in a control circuit, and a two way switch movable to one position to connect the other end of said fixed resistor in said control circuit for exclusion from said circuit of said variable resistor by movement of said contact mechanism in one direction and to another position to connect the other end of said variable resistor in said control circuit for exclusion from said circuit of said variable resistor by return movement of said contact mechanism.

4. In a control system a pair of motor controlling resistors, a controller for varying one of said resistors, switch mechanism movable to a first position to connect said resistors in a control circuit with each other for exclusion from said circuit of said one resistor by movement of said controller in one direction and movable to a second position to connect said one resistor in said control circuit alone for exclusion from said circuit of said one resistor by return movement of said controller, a third resistor for connection in said circuit, and means for excluding said third resistor from said circuit and for returning said switch mechanism to said first position.

5. In a control system a fixed resistor, a variable resistor, contact mechanism movable in either of two directions for varying said variable resistor, connections for connecting one end of one of said resistors to one end of the other of said resistors, connections for connecting said contact mechanism in a control circuit, and a switch movable to a first position to connect the other end of said fixed resistor in said control circuit for exclusion of said variable resistor from said circuit by movement of said contact mechanism in one direction and to a second position to connect the other end of said variable resistor in said control circuit for exclusion of said variable resistor from said circuit by return movement of said contact mechanism, a second fixed resistor for connection in said control circuit, and means for excluding said second fixed resistor from said circuit and for returning said switch to said first position to reinsert in said circuit said first fixed resistor and said variable resistor.

6. In a motor control system, a plurality of motor controlling resistors for connection in circuit with a motor, a controller associated with one of said resistors, means for operating said controller in one direction to exclude said one resistor from said motor circuit, means responsive to said operation of said controller for excluding another of said resistors and for reinserting said one resistor in said motor circuit, and means including said operating means for operating said controller in a reverse direction to exclude said one resistor from said motor circuit a second time.

7. In a motor control system, a plurality of motor controlling resistors for connection in circuit with a motor, a controller associated with one of said resistors, means for operating said controller in one direction progressively to exclude said one resistor from the motor circuit, means responsive to said operation of said controller for quickly excluding another of said resistors and for reinserting said one resistor in the motor circuit, means including said operating means for operating said controller in a reverse direction progressively to exclude said resistor from the motor circuit a second time, and means responsive to the current in the motor circuit for governing the speed of said operating means in both directions.

8. In a motor control system, the combination of an electric motor, a plurality of motor controlling resistors, means for connecting said resistors in circuit with said motor, a controller associated with one of said resistors, means for operating said controller from one position to a second position to exclude said one resistor from said motor circuit, transfer means operable when said controller reaches said second position for excluding a second one of said resistors and for reinserting said one resistor in said motor circuit, and means including said operating means responsive to operation of said transfer means for reversely operating said controller from said second position to said one position progressively to exclude said one resistor from said motor circuit a second time.

9. In a motor control system, the combination of an electric motor, a plurality of motor controlling resistors, means for connecting said resistors in circuit with said motor, a controller associated with one of said resistors, a fluid operator for said controller, control means for effecting operation of said fluid operator in one direction thereby to move said controller from one position to a second position progressively to exclude said one resistor from said motor circuit, transfer means operable when said controller reaches said second position for excluding a second one of said resistors and for reinserting said one resistor in said motor circuit, and means responsive to operation of said transfer means for influencing said control means to effect reverse operation of said fluid operator thereby to move said controller from said second position to said one position progressively to exclude said one resistor from said motor circuit a second time.

10. In a motor control system, a pair of accelerating resistors, a third accelerating resistor, a master controller selectively movable to a plurality of positions, means responsive to movement of said master controller to one position for connecting said resistors in a control circuit, switch means responsive to operation of said master controller to another position for quickly excluding said third resistor from said circuit, an acceleration controller associated with one of said pair of resistors, means responsive to operation of said switch means for operating said acceleration controller in one direction progressively to exclude said one resistor from said circuit, transfer means responsive to said operation of said acceleration controller for quickly excluding the second resistor of said pair and for reinserting said one resistor in said circuit, and means including said operating means responsive to operation of said transfer means for operating said acceleration controller in a reverse direction progressively to exclude said one resistor from said circuit a second time.

11. In a motor control system, a plurality of motor controlling resistors for connection in circuit with a motor, a controller associated with one of said resistors, a reciprocating fluid pressure operating device having opposing pistons each for operating said controller in a corresponding direction, timing means comprising a chamber having an incompressible fluid therein, normally open valve means controlling the flow of said fluid for establishing communication between said chamber and one of said pistons, valve mechanism for selectively admitting pressure either to said chamber or to the other of said pistons to effect timed operation of said controller in a corresponding direction, means for controlling said valve mechanism to effect operation of said controller in one direction progressively to exclude said one resistor from said circuit, transfer means responsive to said operation of said controller for excluding another of said resistors and for reinserting said one resistor in said circuit, means responsive to operation of said transfer means for controlling said valve mechanism to effect operation of said controller in a reverse direction progressively to exclude said one resistor from said circuit a second time, and means for selectively closing said normally open valve means to stop said controller in any position or for opening further said normally open valve means to increase the speed of operation of said controller.

12. In a motor control system, the combination of an electric motor, a plurality of motor controlling resistors connected in circuit with said motor, a controller associated with one of said resistors, a reciprocating fluid pressure operating device having opposing pistons each for operating said controller in a corresponding direction, timing means comprising a chamber having an incompressible fluid therein, normally open valve means controlling the flow of said fluid for establishing communication between said chamber and one of said pistons, valve mechanism for selectively admitting pressure either to said chamber or to the other of said pistons to effect timed operation of said controller in a corresponding direction, means for controlling said valve mechanism to effect operation of said controller in one direction progressively to exclude said one resistor from said motor circuit, transfer means responsive to said operation of said controller for excluding another of said resistors and for reinserting said one resistor in said motor circuit, means responsive to operation of said transfer means for controlling said valve mechanism to effect operation of said controller in a reverse direction progressively to exclude said one resistor from said motor circuit a second time, current responsive means for selectively closing said normally open valve means to stop said controller or for opening further said normally open valve means to increase the speed of operation of said controller whereby a substantially constant motor current is obtained, and means for adjusting the current setting of said current responsive means.

13. In combination, a circuit controller selectively operable in two directions through a series of circuit controlling positions, a reciprocating fluid pressure operating device therefor having opposing pistons each for operating said controller in a corresponding direction, timing means comprising a chamber having an incompressible fluid therein in communication through a restricted orifice with one of said pistons, valve mechanism for selectively admitting pressure either to said chamber or to the other of said pistons to effect timed operation of said controller in a corresponding direction, and means responsive to an electrical condition of the circuit for selectively closing said restricted orifice to stop said controller or for enlarging said orifice to increase the speed of said controller.

14. In combination, a circuit controller selectively operable in two directions through a series of circuit controlling positions, a reciprocating fluid pressure operating device therefor having opposing pistons each for operating said circuit controller in a corresponding direction, timing means comprising a chamber having an incompressible fluid therein, normally open valve means for establishing communication between said chamber and one of said pistons, valve mechanism for selectively admitting pressure either to said chamber or to the other piston to effect timed operation of said controller in a corresponding direction, and means responsive to an electrical condition of the circuit for selectively closing said normally open valve means to stop said controller or for opening further said normally open valve means to increase the speed of operation of said controller.

15. In combinaton, a motor controller selectively operable in two directions through a series of positions, a reciprocating fluid pressure operating device therefor having opposing pistons each for operating said circuit controller in a corresponding direction, timing means comprising a chamber having an incompressible fluid therein, normally open valve means for establishing communication between said chamber and one of said pistons, valve mechanism for selectively admitting pressure either to said chamber or to the other of said pistons to effect timed operation of said controller in a corresponding direction, current responsive means for selectively closing said normally open valve means to stop said controller or for opening further said valve means to increase the speed of said controller whereby a substantially constant motor current is maintained, and means for adjusting the setting of said current responsive means.

16. In a motor control system, a plurality of motor controlling resistors for connection in circuit with a motor, a controller operable through forward and return trips between two positions to control the progressive exclusion of a first one of said resistors from the motor circuit, means responsive to the exclusion of said first resistor during a forward trip of said controller for excluding a second resistor and reinserting said first resistor for exclusion during the return trip of said controller, and means responsive to completion of said return trip for excluding a third one of said resistors and for reinserting said first and said second resistors for progressive exclusion during succeeding forward and return trips of said controller.

17. In a motor control system, a plurality of motor controlling resistors connected in circuit with a motor, a controller, means for selectively operating said controller through forward and return trips between two positions to control the progressive exclusion of a first one of said resistors from the motor circuit, transfer means responsive to the exclusion of said first resistor during a forward trip of said controller for excluding a second resistor and for reinserting said first resistor in the motor circuit, means responsive to operation of said transfer means for controlling said operating means to effect return movement of said controller progressively to exclude said first resistor a second time, switch means for controlling a third resistor, said transfer means being responsive to completion of said return trip for reinserting said first and said second resistors and for controlling said switch means to exclude said third resistor, and means responsive to operation of said switch means for controlling said operating means again to effect a forward trip of said controller progressively to exclude said resistor a third time, said transfer means again operating at the completion of the forward trip to exclude said second resistor and to reinsert said first resistor for exclusion a fourth time during return movement of said controller.

18. In a motor control system, the combination of an electric motor, a plurality of motor controlling resistors for connection in circuit with said motor, transfer means for controlling the connections of two of said resistors, a controller sequentially operable through forward and return trips between two positions for controlling a first one of said two resistors, said transfer means being responsive to the progressive exclusion of said first resistor from the motor circuit during a forward trip of said controller for excluding the second one of said two resistors and reinserting said first resistor for progressive exclusion a second time during the return trip of said controller, switch means for controlling the inclusion and exclusion of a third one of said resistors, master control means for selectively connecting said motor and said resistors in accelerating or braking circuits, means responsive to establishment of said accelerating circuits for first effecting operation of said switch means to exclude said third resistor and for then effecting operation of said controller through said two trips progressively to exclude said two resistors, and means responsive to establishment of said braking circuits for effecting progressive exclusion of said three resistors by operating said controller through four trips, said switch means and said transfer means cooperating at the end of the second trip of said controller to exclude said third resistor and to reinsert said two resistors for progressive exclusion a second time during the succeeding two trips of said controller.

19. In a motor control system, a plurality of motor controlling resistors, means for connecting said resistors in acceleration and braking circuits with a motor for acceleration and braking of the motor, a controller operable through predetermined forward and return trips progressively to exclude a first one of said resistors, means for reinserting said first resistor in the motor circuit in place of a second resistor at the completion of each forward trip of said controller, means for operating said controller through two trips progressively to exclude said first and second resistors from the motor circuit during acceleration, and means for operating said controller through four trips during braking, said last mentioned means including means for reinserting said first and said second resistors in said braking circuit in place of a third resistor upon completion of said second trip whereby said three resistors are progressively excluded from said braking circuit during said four trips of said controller.

20. In a motor control system having an electric motor, a motor controlling resistor, and control means for progressively excluding said resistor from the motor circuit, the combination of master control means for selectively connecting said motor and said resistor for acceleration or for dynamic braking, said master control means including separately operable braking and accelerating controllers, relay means having an armature movable from one position to another position for controlling the speed of operation of said resistor control means, spring means biasing said armature to said one position, means for energizing said relay means in accordance with the motor current during both braking and acceleration, whereby said relay means controls said resistor control means to maintain substantially constant motor current, and means responsive to operation of either said braking controller or said accelerating controller for adjusting said spring to vary the bias on said armature and the current setting of said relay means.

21. In a motor control system having an electric motor, a motor controlling resistor, a resistor controller, and means for operating said resistor controller progressively to exclude said resistor from the motor circuit, the combination of master control means including separately operable braking and accelerating controllers for selectively connecting said resistor and said motor for acceleration or for dynamic braking, relay means having an armature normally biased to one position and operable to another position to control the speed of said operating means, means for energizing said relay means to operate said armature in accordance with the motor current during both acceleration and braking, whereby a substantially constant motor current is maintained, and cam means responsive to operation of either said braking controller or said accelerating controller for adjusting the bias on said armature to vary the value of the motor current maintained by said relay means.

22. In combination, a motor controller selectively operable in two directions through a series of positions, a reciprocating fluid pressure operating device therefor having opposing pistons each for operating said circuit controller in a corresponding direction, timing means comprising a chamber having an incompressible fluid therein, normally open valve means for establishing communication between said chamber and one of said pistons, valve mechanism for selectively admitting pressure either to said chamber or to the other of said pistons to effect timed operation of said controller in a corresponding direction, selectively energizable means for opening further said normally open valve means to operate said controller at a high speed or for closing said normally open valve means to stop said controller, relay means normally biased to one position for energizing said selectively energizable means to effect high speed operation of said controller, means energizing said relay in accordance with the motor current for operating said relay to deenergize said selective means and operate said controller at its normal speed upon the occurrence of predetermined current conditions, and for further operating said relay to energize said selective means to close said valve means and stop said controller upon the occurrence of other predetermined current conditions.

23. In combination, a motor controller selectively operable in two directions through a series of positions, a reciprocating fluid pressure operating device therefor having opposing pistons each for operating said circuit controller in a corresponding direction, timing means comprising a chamber having an incompressible fluid therein, normally open valve means for establishing communication between said chamber and one of said pistons, valve mechanism for selectively admitting pressure either to said chamber or to the other of said pistons to effect timed operation of said controller in a corresponding direction, selectively energizable means for opening further said normally open valve means to operate said controller at a high speed or for closing said normally open valve means to stop said controller, relay means having front and back fixed contacts and a movable contact normally biased into engagement with said fixed contact for energizing said selectively energizable means to effect high speed operation of said controller, energizing means for said relay for operating said movable contact to an intermediate position to deenergize said selectively energizable means and effect normal operation of said controller upon the occurrence of predetermined current conditions, said relay energizing means effecting further operation of said movable contact to engage said back contact and energize said selectively energizable means to stop said controller upon the occurrence of other predetermined current conditions.

JOHN F. TRITLE.